US006817588B2

(12) United States Patent
Tsai

(10) Patent No.: US 6,817,588 B2
(45) Date of Patent: Nov. 16, 2004

(54) PORT REPLICATOR AND RESILIENT PIECE USED THEREIN

(75) Inventor: Dui-Ming Tsai, Taipei (TW)

(73) Assignee: Quanta Computer, Inc., Taoyuan (TW)

( * ) Notice: Subject to any disclaimer, the term of this patent is extended or adjusted under 35 U.S.C. 154(b) by 164 days.

(21) Appl. No.: 10/264,936

(22) Filed: Oct. 4, 2002

(65) Prior Publication Data

US 2003/0197109 A1 Oct. 23, 2003

(30) Foreign Application Priority Data

Apr. 17, 2002 (TW) ..................................... 91205124 U

(51) Int. Cl.⁷ ............................................. F16M 13/00
(52) U.S. Cl. ..................... 248/562; 361/686; 439/378
(58) Field of Search ............................... 248/562, 632, 248/629, 617, 613, 610, 622, 626, 563; 361/725, 727, 724, 506, 686, 685, 799; 439/378, 680, 674, 677, 352, 747, 724, 725, 727; 403/13, 397, 408.1

(56) References Cited

U.S. PATENT DOCUMENTS

| | | | | |
|---|---|---|---|---|
| 5,644,474 A | * | 7/1997 | Jang ............................. 361/753 |
| 6,135,801 A | * | 10/2000 | Helot et al. .................. 439/341 |
| 6,195,265 B1 | * | 2/2001 | Choi ........................... 361/799 |
| 6,305,067 B1 | * | 10/2001 | Horng .......................... 29/458 |
| 6,310,766 B1 | * | 10/2001 | Bae ............................. 361/681 |
| 6,366,458 B1 | * | 4/2002 | Yoshida et al. ............. 361/686 |
| 6,424,538 B1 | * | 7/2002 | Paquin ....................... 361/752 |
| 6,501,645 B1 | * | 12/2002 | Hanazawa et al. .......... 361/685 |
| 6,534,706 B1 | * | 3/2003 | Rapp et al. ............ 174/35 GC |

FOREIGN PATENT DOCUMENTS

| | | | | |
|---|---|---|---|---|
| EP | 0410768 B1 | * | 7/1990 | ......... H01R/13/719 |
| TW | 457843 | | 10/2001 | |

* cited by examiner

Primary Examiner—Gwendolyn Baxter
(74) Attorney, Agent, or Firm—Thomas, Kayden, Horstemeyer & Risley

(57) ABSTRACT

A port replicator and a resilient piece used therein. The resilient piece is disposed in the port replicator supporting a portable computer, and comprises a body and an abutting member. The body includes a first portion and a second portion integrally formed with the first portion. The first portion includes a first end connecting with the second portion and a second end opposite the first end. The second end is fixedly disposed in the port replicator. The second portion includes a third end connecting with the first portion and a fourth end opposite the third end. A cross section of the second portion is substantially Z-shaped. The fourth end is fixedly disposed in the port replicator. The abutting member is disposed on the third end and protrudes from the port replicator to abut the portable computer supported by the port replicator. Thus, electromagnetic interference generated from the portable computer is dissipated.

20 Claims, 6 Drawing Sheets

PORT REPLICATOR AND RESILIENT PIECE USED THEREIN

BACKGROUND OF THE INVENTION

1. Field of the Invention

The invention relates to a port replicator and a resilient piece used therein; in particular, a resilient piece that can properly dissipate electromagnetic interference generated from an electronic device abutting the resilient piece.

2. Description of the Related Art

All electronic devices radiate electromagnetic energy as they operate. To prevent such emissions from interfering with the operation of other nearby devices, and to comply with emission standards set by bodies such as the Federal Communications Commission, electronic devices are designed to provide shielding or coupling which limits the electromagnetic interference (EMI) from the devices. Designing devices for EMI compliance includes both electronic and physical design considerations. Also, devices must be EMI-compliant in different, realistic operating modes, including any mode of operation considered worst-case for EMI radiation. Therefore, there is a continuing need for creative approaches to the problem of EMI compliance (It is noted that while the invention, as described, has particular applicability to EMI compliance, similar structures, approaches, etc., similar techniques may also be used for electrostatic discharge [ESD] design).

For example, a resilient piece may be disposed in an electronic device so as to dissipate EMI. Generally, the resilient piece for dissipating EMI is fixed in the electronic device at both ends. However, in some situations, the resilient piece protrudes from the electronic device. For example, in a port replicator supporting a portable computer, a resilient piece disposed in the port replicator protrudes from the port replicator. Thus, when the portable computer is disposed on the port replicator, it is in contact with the resilient piece of the port replicator so that EMI generated by the portable computer is dissipated via the resilient piece. Specifically, the resilient piece is disposed in the port replicator in a cantilevered manner so as to provide the resilient piece with supporting resilience.

Referring to FIG. 1a, a cantilevered resilient piece 10 includes a fixed portion 11 and a cantilevered portion 12. A nut 13 is disposed on the cantilevered portion 12. The fixed portion 11 is disposed in an electronic device (not shown) by two rivets 14.

FIG. 1b shows that the resilient piece 10 is disposed in a port replicator 20. The port replicator 20 includes a base 21 and a cover 22. The fixed portion 11 of the resilient piece 10 is fixed on the base 21 of the port replicator 20 by two rivets 14. The cover 22 includes an opening 221 for the nut 13 of the resilient piece 10 to protrude from the port replicator 20.

Referring to FIG. 1c, when a portable computer 30 is disposed on the port replicator 20 as shown in FIG. 1b, an abutting portion 31 of the portable computer 30 abuts the nut 13 of the resilient piece 10. By means of the resilient piece 10, EMI generated from the portable computer 30 is dissipated.

However, the cantilevered resilient piece has the following disadvantages:

1. It is difficult to align the protruding nut of the cantilevered resilient piece with the opening of the electronic device due to the cantilevered design.

2. The elasticity of the cantilevered resilient piece is not sufficient to closely abut the electronic device disposed on it.

3. When an external force, which is over the elastic limit of the cantilevered resilient, presses down the nut of the resilient piece, the cantilevered resilient piece is easily deformed and the resilience of the cantilevered resilient is deteriorated.

SUMMARY OF THE INVENTION

In order to address the disadvantages of the aforementioned resilient piece, the invention provides a resilient piece that can properly dissipate electromagnetic interference generated from an electronic device abutting the resilient piece.

Accordingly, the invention provides a resilient piece. The resilient piece is disposed in a port replicator supporting a portable computer, and comprises a body and an abutting member. The body includes a first portion and a second portion integrally formed with the first portion. The first portion includes a first end connecting with the second portion and a second end opposite the first end. The second end is fixedly disposed in the port replicator. The second portion includes a third end connecting with the first portion and a fourth end opposite the third end. A cross section of the second portion is substantially zigzag-shaped. The fourth end is fixedly disposed in the port replicator. The abutting member is disposed on the second portion near the third end and protruding from the port replicator so as to abut the portable computer disposed on the port replicator. Thus, electromagnetic interference generated from the portable computer is dissipated via the resilient piece.

In a preferred embodiment, the resilient piece further comprises a post disposed on the second portion near the third end and opposite the abutting member. The post abuts the port replicator to prevent the resilient piece from excessive deformation.

Furthermore, the second portion is formed with a hole for the post to pass through.

In another preferred embodiment, the second portion includes two bending portions, each of rounded.

In another preferred embodiment, both of the first portion and the second portion are riveted to the port replicator. The abutting member is a nut.

In another preferred embodiment, this invention provides a port replicator supporting a portable computer. The port replicator comprises a base, a cover and the resilient piece stated above. The cover is disposed on the base, and the resilient piece is disposed on the base and located between the base and the cover.

BRIEF DESCRIPTION OF THE DRAWINGS

The invention is hereinafter described in detail with reference to the accompanying drawings in which:

FIG. 1b is a schematic view showing a port replicator with the resilient piece as shown in FIG. 1a;

FIG. 2c is a side view showing the resilient piece in FIG. 2a;

FIG. 2d is a top view showing the resilient piece in FIG. 2a;

DETAILED DESCRIPTION OF THE INVENTION

Figure 1A:
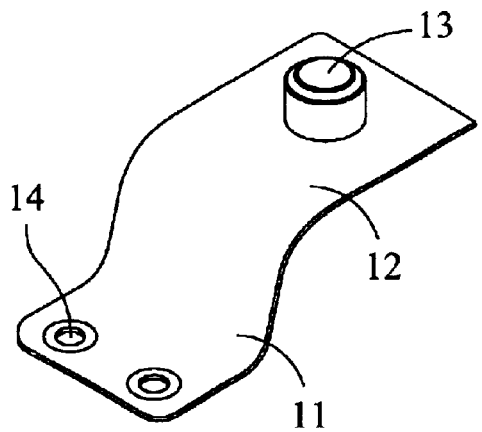
FIG. 1a is a schematic view of a conventional cantilevered resilient piece.
Figure 1B:
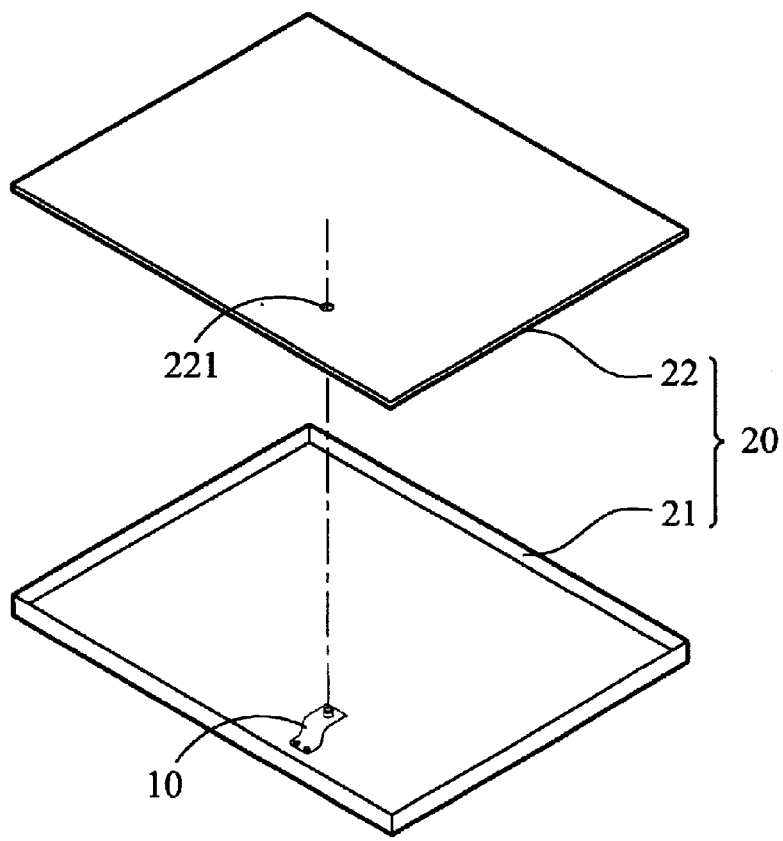
Figure 1C:
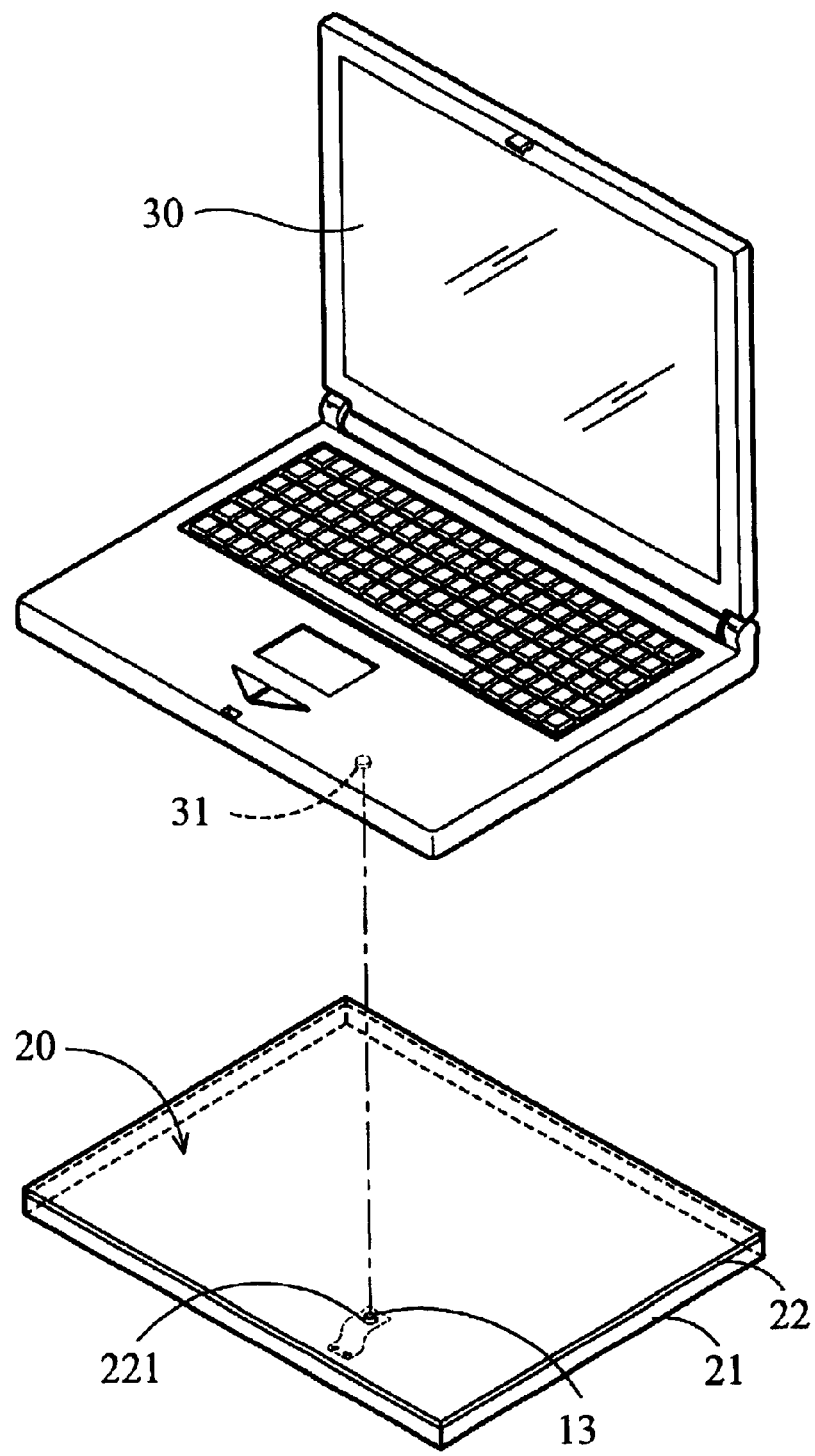
FIG. 1c is a schematic view showing the port replicator in FIG. 1b and a portable computer.
Figures 2A, 2B:
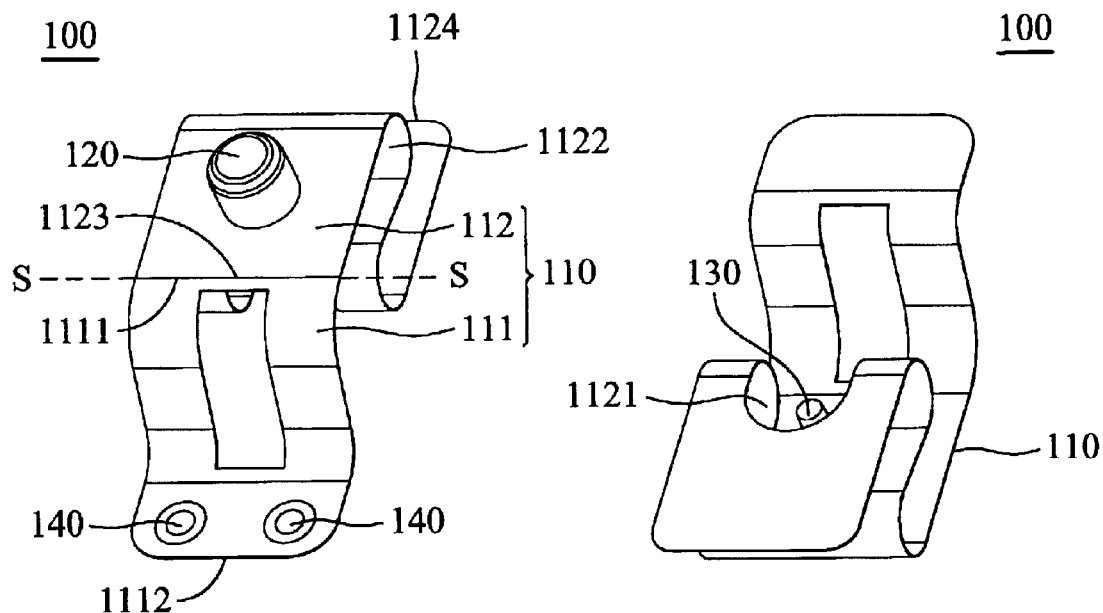
FIG. 2a and FIG. 2b are perspective views showing a resilient piece as disclosed in this invention.
Figures 2C, 2D:
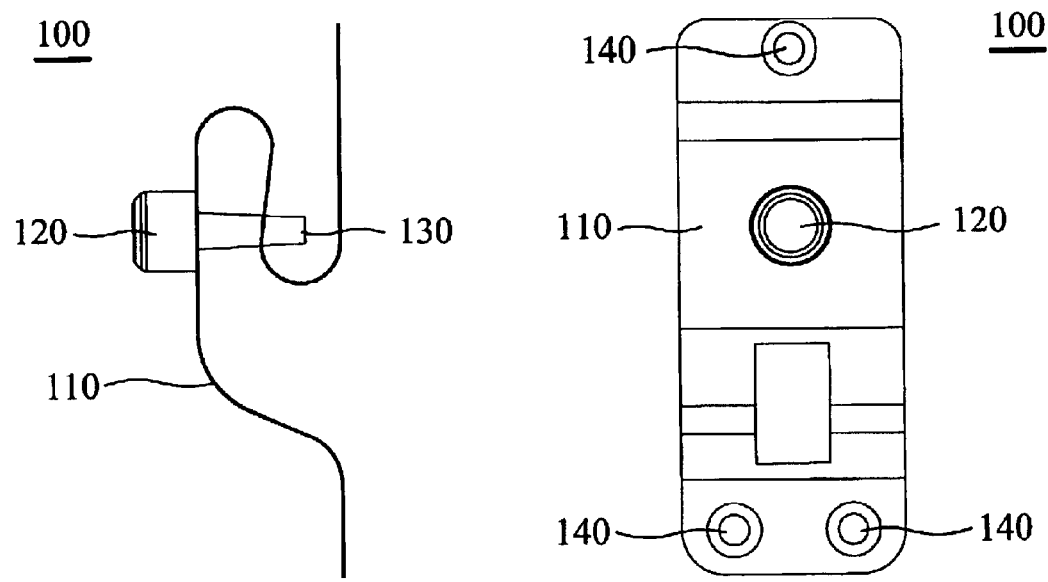
Figure 3A:
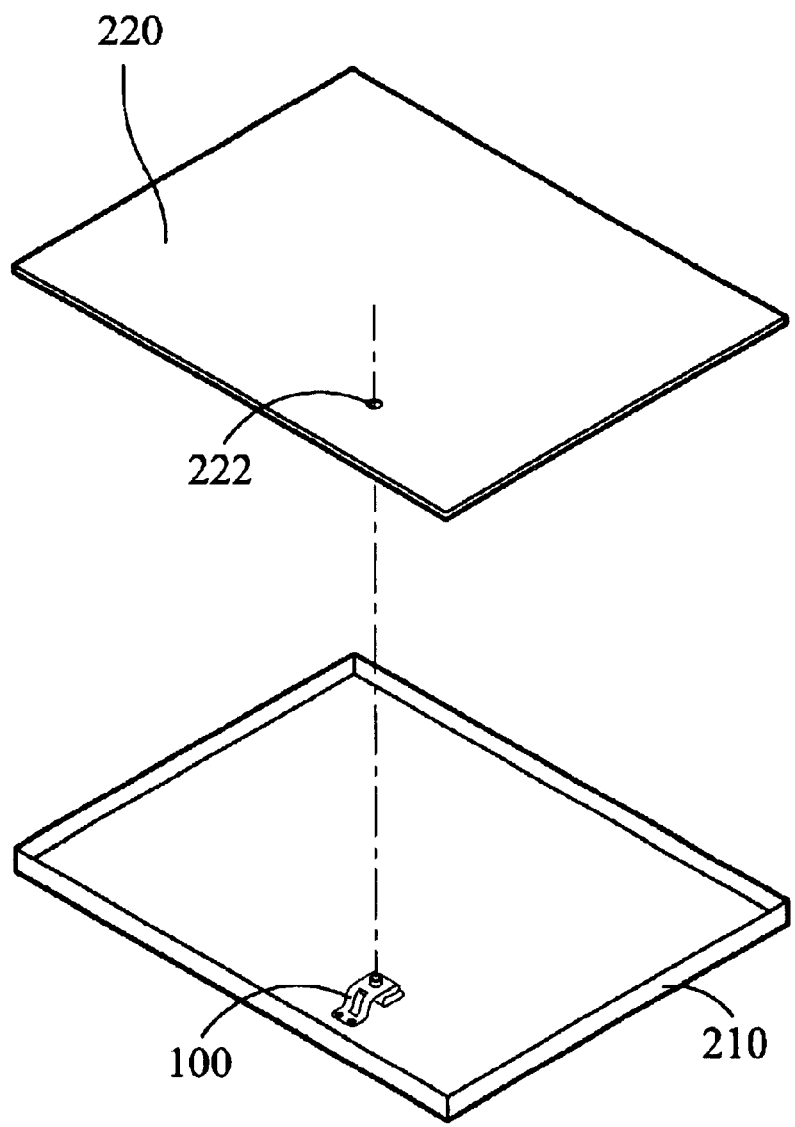
FIG. 3a is a schematic view showing a port replicator as disclosed in this invention.

Referring to FIG. 2a, FIG. 2b, FIG. 2c and FIG. 2d, a resilient piece 100 as disclosed in this invention is disposed in an electronic device 200 as shown in FIG. 3a, and comprises a body 110, an abutting member 120 and a post 130.

The body 110 is used as a main portion of the resilient piece 100, and includes a first portion 111 and a second portion 112 divided by a separation line S as shown in FIG. 2a. The first portion 111 includes a first end 1111 connecting with the second portion 112 and a second end 1112 opposite the first end 1111. The second end 1112 is fixedly disposed in the electronic device 200. The second portion 112 is integrally formed with the first portion 111, and includes a third end 1123 connecting with the first portion 111 and a fourth end 1124 opposite the third end 1123. A cross section of the second portion 112 is substantially zigzag-shaped, such as Z-shaped or S-shaped, as shown in FIG. 2c. The second portion 112 includes a hole 1121 and two bending portions 1122. The post 130 passes through the hole 1121, and each of the bending portions 1122 is rounded. In addition, the fourth end 1124 of the second portion 112 is fixedly disposed in the electronic device 200.

Figure 3B:
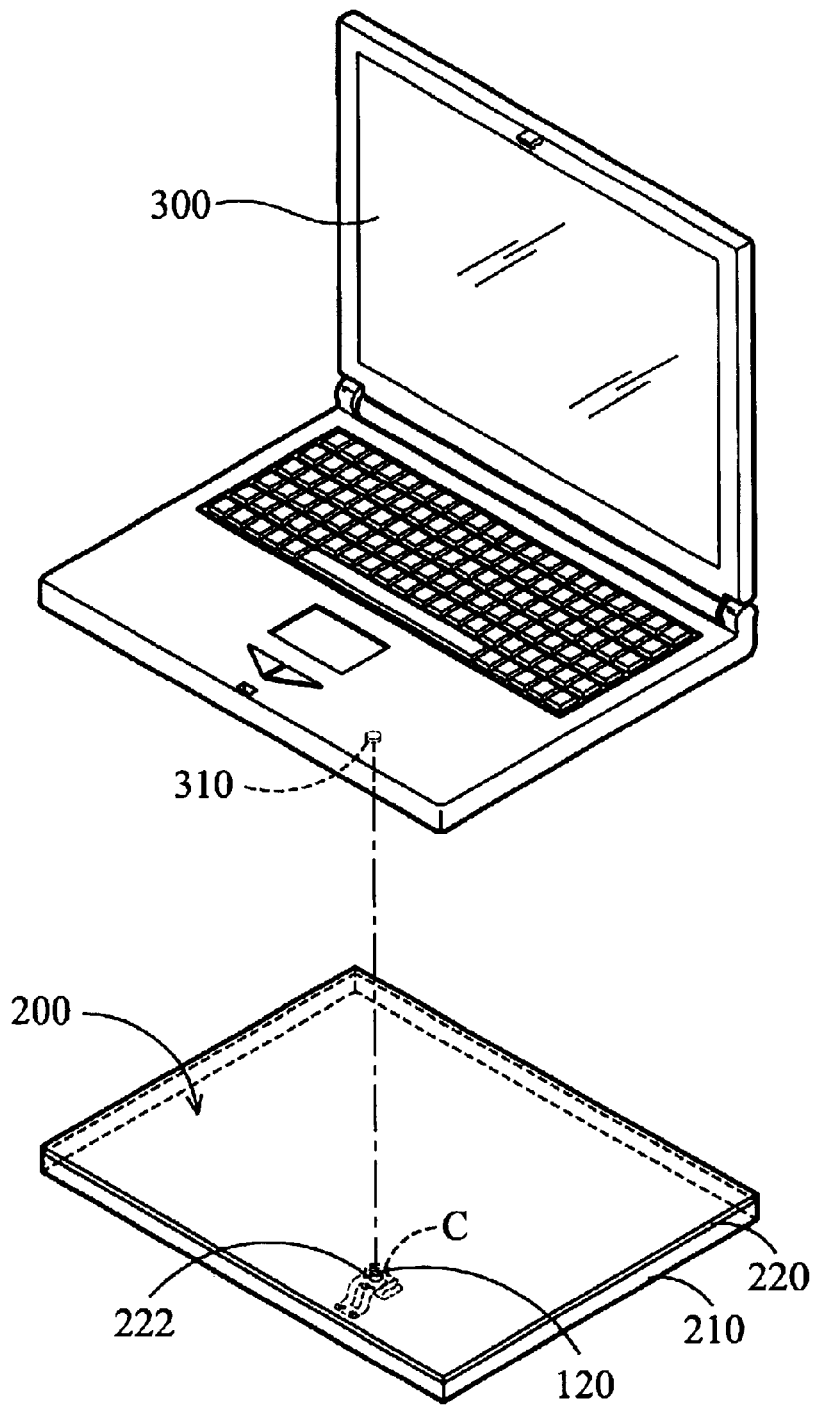
FIG. 3b is a schematic view showing the port replicator in FIG. 3a and a portable computer.

The abutting member 120 is disposed on the second portion 112 near the third end 1123, and protruding from the electronic device 200 as shown in FIG. 3b. The post 130 is disposed on the second portion 112 near the third end 1123, and opposite the abutting member 120.

It is understood that both the first portion 111 and the second portion 112 of the body 110 are riveted to the electronic device 200 by several rivets 140, as shown in FIG. 2d. The abutting member 120 may be a nut.

Figure 3C:
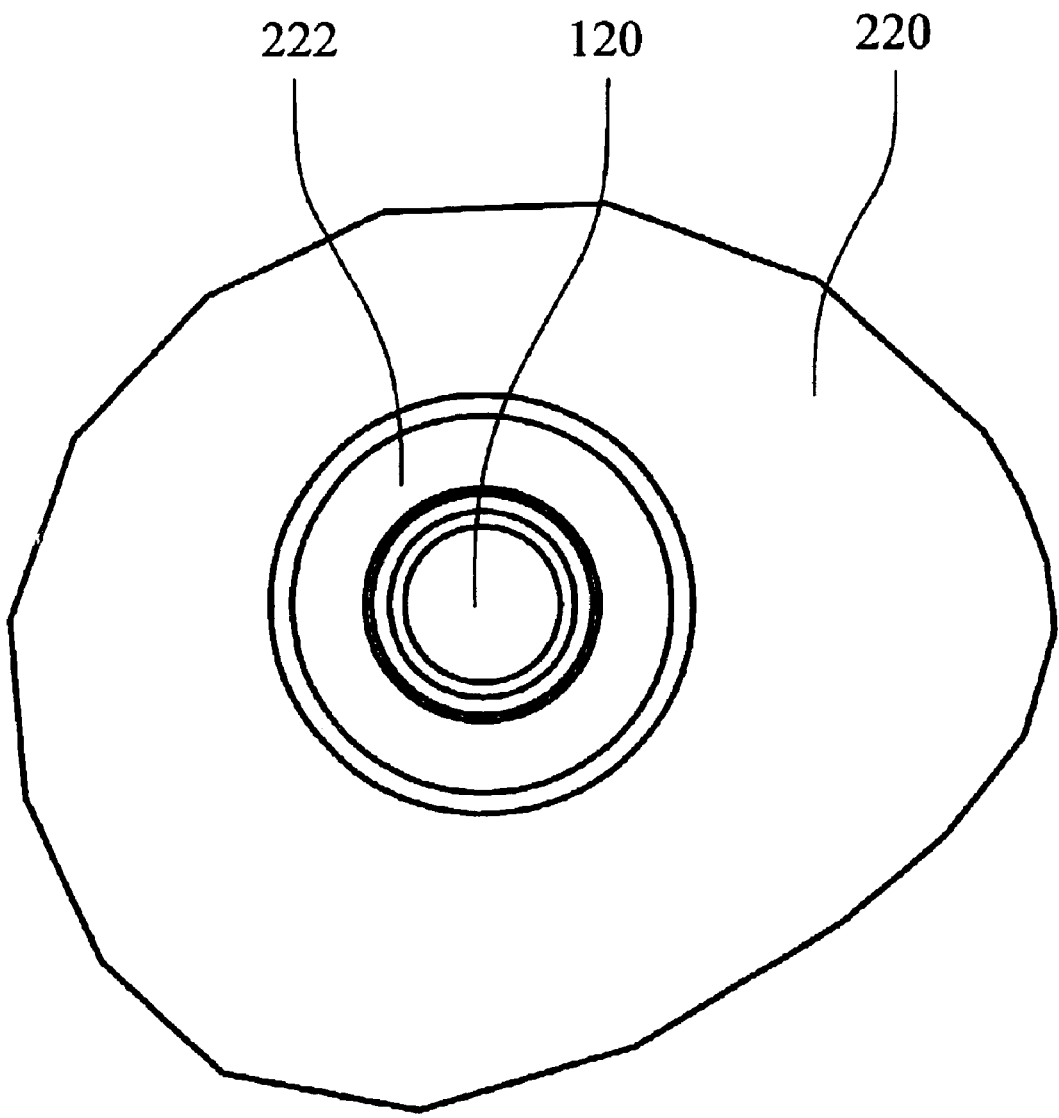
FIG. 3c is a partial enlarged view showing a part C in FIG. 3b.

The structure of the resilient piece 100 is described above. FIG. 3a, FIG. 3b, and FIG. 3c show the resilient piece 100 disposed in the electronic device 200. It is noted that a port replicator 200 represents the electronic device in FIG. 3a, FIG. 3b, and FIG. 3c. The port replicator 200 has a docking bay for receiving and providing electrical connections to a portable computer 300. The port replicator 200 may also have a bus extension that electrically mates with a bus of the portable computer 300 when it is in the docking bay and a number of expansion slots to accommodate hard drives, CD-ROMs, modems etc., not found in the portable computer 300. As a result, when the portable computer 300 is installed in the port replicator 200, its minimalist portable computer capabilities are augmented and extended to those that are typically found in most desktop or non-portable computer systems. In this way, the user enjoys advantages associated with the portable computer 300 while not losing the functionality that would otherwise only be available in a desktop computer system.

Referring to FIG. 3a, the port replicator 200 comprises a base 210, a cover 220 and the resilient piece 100 stated above. The cover 220 is disposed on the base 210, and includes an opening 222 for the abutting member 120 of the resilient piece 100 to pass through. The resilient piece 100 is disposed on the base 210, and is located between the base 210 and the cover 220.

Referring to FIG. 3b, the abutting member 120, protruding from the opening 222 of the second cover 220, abuts a contact portion 310 of the portable computer 300. Thus, the EMI generated from the portable computer 300 is dissipated via the resilient piece 100. In addition, when the abutting member 120 abuts the portable computer 300, the post 130 abuts the base 210 of the port replicator 200 to prevent the resilient piece 100 from excessive deformation.

As stated above, the resilient piece 100 as disclosed in this invention is provided with resilience generated from both the first portion 111 and the second portion 112 so as to enhance the elasticity of the resilient piece 100. In addition, since a cross section of the first portion 111 is different from that of the second portion 112, the resilience of the resilient piece 100 is easily adjusted.

In addition, since the second portion 112 includes two bending portions 1122, it is easy to align the abutting member 120 of the resilient piece 100 with the opening 222 of the electronic device, as shown in FIG. 3c.

Furthermore, since the post 130 is located opposite the abutting member 120, it can prevent the resilient piece 100 from excessive deformation when external force over the elastic limit of the resilient piece is applied on the abutting member 120.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A resilient piece, disposed in a port replicator supporting a portable computer, comprising:

a body including a first portion and a second portion integrally formed with the first portion, wherein the first portion includes a first end connecting with the second portion and a second end opposite the first end, the second end is fixedly disposed on the port replicator, the second portion includes a third end connecting with the first portion and a fourth end opposite the third end, a cross section of the second portion is substantially zigzag-shaped, and the fourth end is fixedly disposed on the port replicator; and an abutting member disposed on the second portion near the third end and protruding from the port replicator so as to abut the portable computer supported by the port replicator, whereby electromagnetic interference generated from the portable computer is properly dissipated via the resilient piece.

2. The resilient piece as claimed in claim 1, further comprising:

a post, disposed on the second portion near the third end and opposite the abutting member, for abutting the port replicator to prevent the resilient piece from excessive deformation.

3. The resilient piece as claimed in claim 2, wherein the second portion is formed with a hole for the post to pass through.

4. The resilient piece as claimed in claim 1, wherein the second portion includes two bending portions, and each of the bending portions is rounded.

5. The resilient piece as claimed in claim 1, wherein the abutting member is a nut.

6. A resilient piece, disposed in a first electronic device for eliminating electromagnetic interference generated from a second electronic device, comprising:

a body including a first portion and a second portion integrally formed with the first portion, wherein the first portion includes a first end connecting with the second portion and a second end opposite the first end, the second end is fixedly disposed in the first electronic device, the second portion includes a third end connecting with the first portion and a fourth end opposite the third end, a cross section of the second portion is substantially zigzag-shaped, and the fourth end is fixedly disposed in the first electronic device; and an abutting member disposed on the second portion near the third end and protruding from the first electronic device so as to abut the second electronic device disposed on the first electronic device, whereby the electromagnetic interference generated from the second electronic device is properly dissipated via the resilient piece.

7. The resilient piece as claimed in claim 6, further comprising:

a post, disposed on the second portion near the third end and opposite the abutting member, for abutting the first electronic device to prevent the resilient piece from excessive deformation.

8. The resilient piece as claimed in claim 7, wherein the second portion is formed with a hole for the post to pass through.

9. The resilient piece as claimed in claim 6, wherein the second portion includes two bending portions, and each of the bending portions is rounded.

10. The resilient piece as claimed in claim 6, wherein the first portion is riveted to the first electronic device.

11. The resilient piece as claimed in claim 6, wherein the second portion is riveted to the first electronic device.

12. The resilient piece as claimed in claim 6, wherein the abutting member is a nut.

13. A port replicator supporting a portable computer and comprising:

a base;

a cover disposed on the base; and a resilient piece disposed on the base and located between the base and the cover;

wherein the resilient piece comprises:

a body including a first portion and a second portion integrally formed with the first portion, wherein the first portion includes a first end connecting with the second portion and a second end opposite the first end, the second end is fixedly disposed on the base, the second portion includes a third end connecting with the first portion and a fourth end opposite the third end, a cross section of the second portion is substantially zigzag-shaped, and the fourth end is fixedly disposed on the base; and an abutting member disposed on the second portion near the third end and protruding from the cover so as to abut the portable computer supported by the port replicator, whereby electromagnetic interference generated from the portable computer is dissipated via the resilient piece.

14. The port replicator as claimed in claim 13, wherein the cover is formed with an opening for the abutting member to pass through.

15. The port replicator as claimed in claim 13, wherein the resilient piece further comprises:

a post, disposed on the second portion near the third end and opposite the abutting member, for abutting the base to prevent the resilient piece from excessive deformation.

16. The port replicator as claimed in claim 15, wherein the second portion is formed with a hole for the post to pass through.

17. The port replicator as claimed in claim 13, wherein the second portion includes two bending portions, and each of the bending portions is rounded.

18. The port replicator as claimed in claim 13, wherein the first portion is riveted to the base.

19. The port replicator as claimed in claim 13, wherein the second portion is riveted to the base.

20. The port replicator as claimed in claim 13, wherein the abutting member is a nut.

* * * * *